United States Patent [19]

Schodl

[11] Patent Number: 4,804,263
[45] Date of Patent: Feb. 14, 1989

[54] PROCESS FOR MEASURING FLOW VECTORS IN GAS CURRENTS

[75] Inventor: Richard Schodl, Troisdorf-Eschmar, Fed. Rep. of Germany

[73] Assignee: Deutsche Forschungs -und Versuchsanstalt fur Luft -und Raumfahrt e.V., Cologne, Fed. Rep. of Germany

[21] Appl. No.: 109,275

[22] Filed: Oct. 15, 1987

[30] Foreign Application Priority Data

Apr. 10, 1987 [DE] Fed. Rep. of Germany ....... 3712153

[51] Int. Cl.$^4$ ................................................ G01P 3/36
[52] U.S. Cl. ...................................... 356/28; 356/28.5
[58] Field of Search .................................. 356/28, 28.5

[56] References Cited

U.S. PATENT DOCUMENTS

| | | | |
|---|---|---|---|
| 3,860,342 | 1/1975 | Orloff et al. | 356/28 |
| 3,941,477 | 3/1976 | Schodl | 356/28 |
| 4,206,999 | 6/1980 | Keller | 356/28 |
| 4,346,990 | 8/1982 | Rhodes | 356/28.5 |
| 4,669,876 | 6/1987 | Dopheide | 356/28.5 |
| 4,707,130 | 11/1987 | Hofmann et al. | 356/28 |

OTHER PUBLICATIONS

Dubnistchev et al, Optics & Laser Technology, Jun. 1976, p. 129.

*Primary Examiner*—Stephen C. Buczinski
*Attorney, Agent, or Firm*—Spensley Horn Jubas & Lubitz

[57] ABSTRACT

For the optical measurement of flow vectors in gas currents, two substantially parallel light beams are focused at separate focusing points. The particles traversing the one focusing point are illuminated and thus generate start pulses, while particles traversing the other focusing point produce, as they flash up, stop pulses. By means of such a process, it is possible to determine the component of the flow vector (v) extending in the normal plane to the vertical axis (OA). It is an object of the invention to detect by simple means also the flow vector component extending in parallel to the optical axis (OA). According to the invention, focusing points (FG1, FB2; FB1, FG2) of beams (S1, S2) with different focal distances are produced. In a first measurement (A), the straight line traversing the focusing points (FG1) and (FB2) is formed at an angle ($\gamma_A$) to the normal plane of the optical axis. In a second measurement (B), the straight line traversing the focusing points (FB1, FB2) is produced at an angle ($\gamma_B = \gamma_{-A}$) which has an index opposite to that of the first angle. By forming the difference between the two measuring rates, the flow angle ($\beta$) is determined with respect to the plane normal to the optical axis (OA).

22 Claims, 11 Drawing Sheets

PROCESS FOR MEASURING FLOW VECTORS IN GAS CURRENTS

BACKGROUND OF THE INVENTION

1. Field of the Invention

The invention relates to a process for measuring the flow vectors in gas currents containing optically detectable particles wherein a focusing means focuses at least two spatially separated beams in at least two focusing point in a measuring volume.

2. Description of the Related Art

Processes for measuring flow vectors in gas currents have been known to employ light of a light source focused by a focusing means in the flow channel at two focusing points positioned in a close succession (U.S. Pat. No. 3,941,477). Particles contained in the gas current are illuminated in traversing the focusing points. Due to the stray radiation reflected by the particles, a start pulse is produced when the first focusing point is traversed, while a stop pulse is produced during the traversing of the second focusing point. From the time interval between the start pulse and the stop pulse, it is possible to determine the component of the particle speed vector in direction of the straight line traversing the focusing points. By moving the focusing device, said direction may be varied thus permitting the detection of flow vectors having different directions. However, by said method, it is only possible to measure the components of the flow vectors which extend in a normal plane relative to the optical axis of the focusing means. The component extending in the direction of the optical axis may not be determined. Said process is designated to 2d-process to refer to the two-dimensional vector measurement.

A further development of said process is designated as 3d-process, by which the vector component extending in direction of the optical axis may be detected as well (British Pat. No. 2,109,548) and in which four laser beams are used two of which each form a beam pair. The beams of each pair being directed to two focusing points situated in the same normal plane relative to the optical axis. Due to the differences of the direction of incidence of the beams directed to a focusing point, the flow directions measured by means of the beam pairs are determined differently. From said difference of direction, one may draw a conclusion concerning the flow component in direction of the optical axis of the system. The expenditure and the laser capacity required by said known process are quite considerable.

SUMMARY OF THE INVENTION

It is an object of the invention to provide a process for measuring the flow vectors in gas currents, by which it is possible to also measure, by simple means, the flow vector component extending in direction of the optical axis thus permitting the determination, with the use of only two light beams, of the flow vector in a three-dimensional space.

According to the invention, the focusing points spaced differently from the optical axis are additionally offset mutually in direction of the optical axis. There is performed a first measurement in that the focusing means of one beam is closer to the focusing point than that of the other beam; thereafter, a second measurement is performed wherein the conditions are vice-versa with respect to the first measurement so that the focusing point of the first beam is farther away from the focusing means than that of the second beam. As a result, the angle formed by the straight line traversing the focusing points, with the plane normal to the optical axis is positive during one measurement and negative during the other measurement. In both measurements, the frequency of the particle detection is determined; i.e., the occurrence of fellow pairs of start pulses and stop pulses. The difference between both measuring results is used for the detection of the three-dimensional flow vector, or, stated more accurately, for the detection of the component of said vector extending in direction of the optical axis. The term "difference" does not necessarily refer to the differences between both measuring values but it also includes a quotient formation or another correlation. There are different mathematic methods for determining from both measurements the vector component extending in the direction of the optical axis.

It is possible, according to the process of one embodiment of the invention, to perform the two measurements successively in the time for determining the vector component of the flow extending in the optical axis, in that, between the two measurements, the focusing means is rotated about its axis through 180°. This process variant is feasible with a reduced apparatus expenditure, but, due to the two required successive measurements, it takes much more time.

In another process variant, both measurements are made simultaneously. From each of the two spatially separated beams, there is generated a number of focusing points consisting of different light colors and having different focal lengths. In performing a first measurement, one may select two focusing points which are situated on a straight line extending at a positive angle with respect to the plane normal to the optical axis, while, concerning the second measurement, the focusing points selected are on a straight line extending at a negative angle relative to the stated normal plane. This process variant requires at least four focusing points, of which two are always situated on a common beam. Both beams may be generated from the same light source by a different polarization and subsequent spatial separation of light. Preferably, the amounts of the positive and of the negative angle of the straight line traversing the two pairs of the focusing points are equal with respect to the plane normal to the optical axis.

BRIEF DESCRIPTION OF THE DRAWINGS

Some embodiments of the invention will be explained hereunder in more detail with reference to the drawings in which.

DESCRIPTION OF THE EMBODIMENTS

The principles of an embodiment of the invention are explained hereunder with reference to FIGS. 1 to 9.

Figure 1:
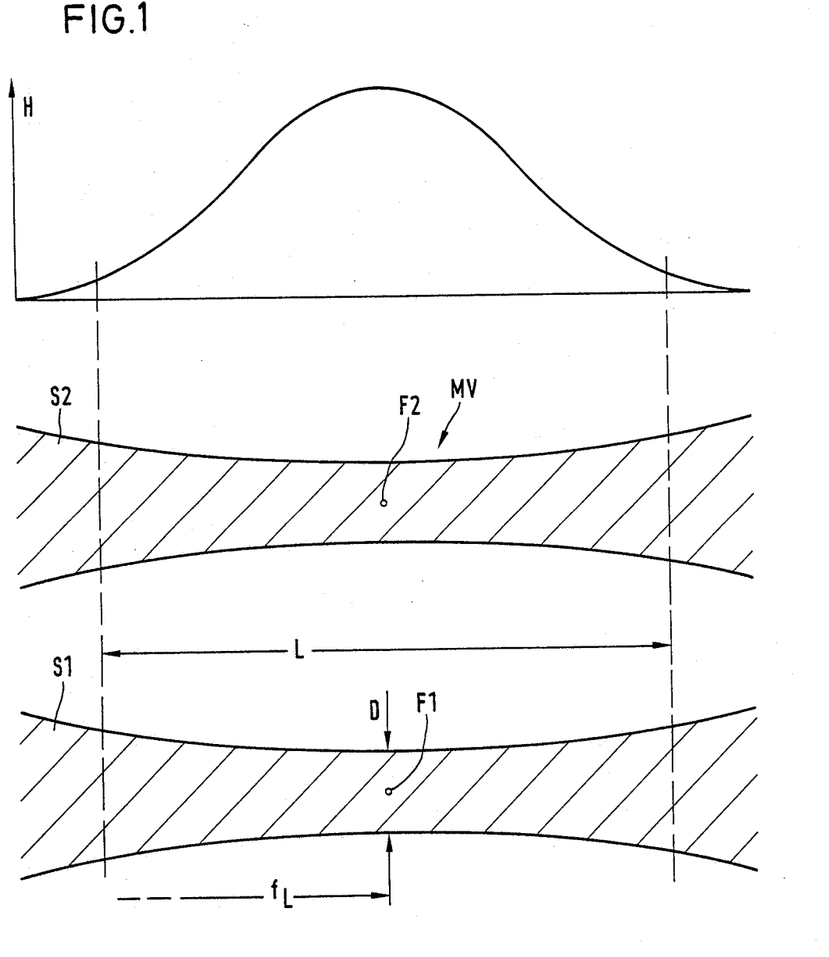
FIG. 1 is an elevational view of the geometry of the measuring volume in an embodiment having two focusing points equally spaced from the focusing means, the frequency distribution of the detection of the particle passages being illustrated as a function of the axial position at which the particles pass the beams.

FIG. 1 shows the measuring volume geometry of a two dimensional two-focus method. In the measuring volume MV of the flow channel, two light beams S1 and S2 extending substantially in parallel and at a small mutual distance are focused at points F1 and F2 separated spatially. The axial extension L of the measuring volume MV is determined by the axial intensity distribution in the beams and by the light path of the observing optics being optimized to the beam centers. A particle flying through the center of a focusing point and being illuminated by the respective beam supplies to a photodetector a signal of a maximum amplitude. The axial length L of the focusing point is so selected that the same particle, if flying through the marginal region, supplies a signal of a tenth of the maximum amplitude only. Since, in real currents, the particules present are always of different sizes (small particles supply a smaller signal amplitude but are more frequently present than big particle), the small particles are still detected in the axial center of the focusing point, while, in the marginal region, the big particles are detected but are considerably less frequent. The upper part of FIG. 1 shows the frequency H of the detection signals of particles as a function of the axial position in which the particles traverse the elongated focusing point. The typical axial length of a focusing points is 0.4 mm.

Figure 2:
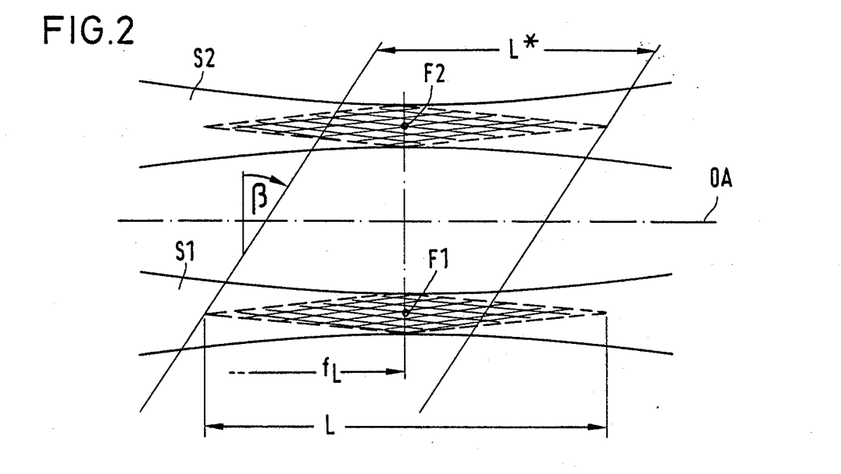
FIG. 2 is an illustration of two focusing points showing the sensitivity characteristic.
Figure 3:
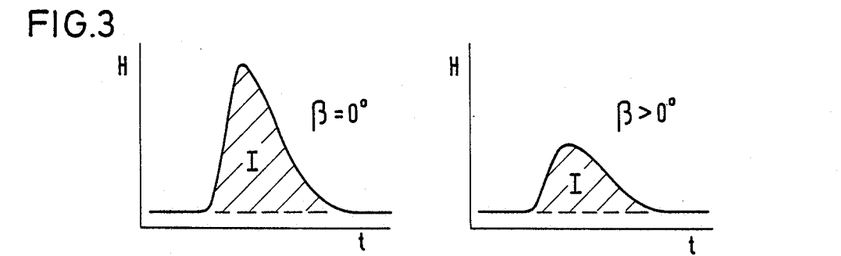
FIG. 3 shows two graphs of the frequency of measuring results in an embodiment employing different angles $\beta$ of the current in relation to the plane normal to the optical axis.

In an embodiment having the beam pair S1, S2, shown in FIG. 2, the center of the focusing points F1 and F2 are at the same distance $f_L$ (focusing length) from the focusing means. The sensitive characteristic is indicated by cross-hatched surfaces in the beams. If the current flows at an angle $\beta$ to the normal line with respect to the optical axis OA of the focusing system in the plane of beams S1 and S2 (plane of the drawing), the frequency distributions H of the measured flight times t are shown in FIG. 3 for different angles $\beta$. If angle $\beta$ is unequal to zero, the effective axial length L of the measuring volume is reduced to L*. A decrease of frequency H entails an increase of the amount of angle $\beta$. The influence of the flow angle $\beta$ is intensified by the abovementioned axial sensitivity characteristic.

FIG. 3 shows the integral value I of the frequency distribution H as a hatched region of the curves, said integral value I being, based on the time of measurement, the unit for the measuring frequency.

Figure 4:
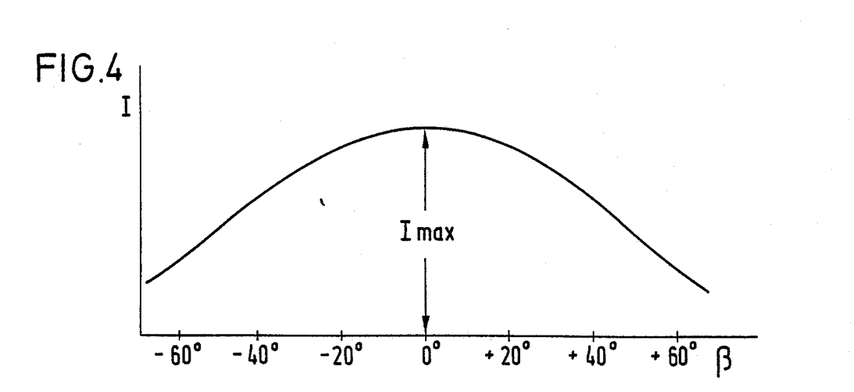
FIG. 4 represents the integral value I of the frequency distribution with respect to the angle $\beta$.

In FIG. 4, the integral value I (proportional to the frequency of measuring results = measuring rate) is entered above the flow angle $\beta$. To determine the axial component of flow vector, it would be possible to benefit from the dependency of the measuring rate upon flow angle $\beta$, however, the measuring rate is dictated by a number of other parameters such as particle density, laser capacity, sensitivity of photodetectors etc. thus practically prohibiting a clear calibration.

Figure 5:
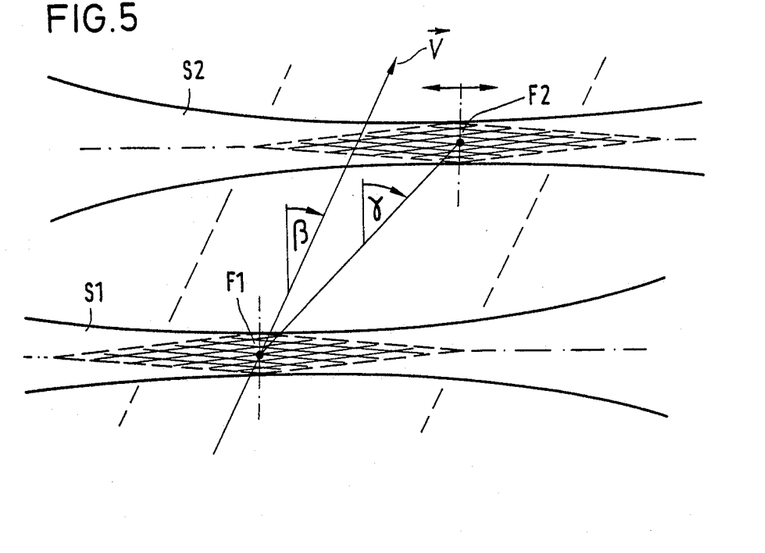
FIG. 5 shows the situation in an embodiment having focusing points offset mutually in direction of the optical axis.
Figure 6:
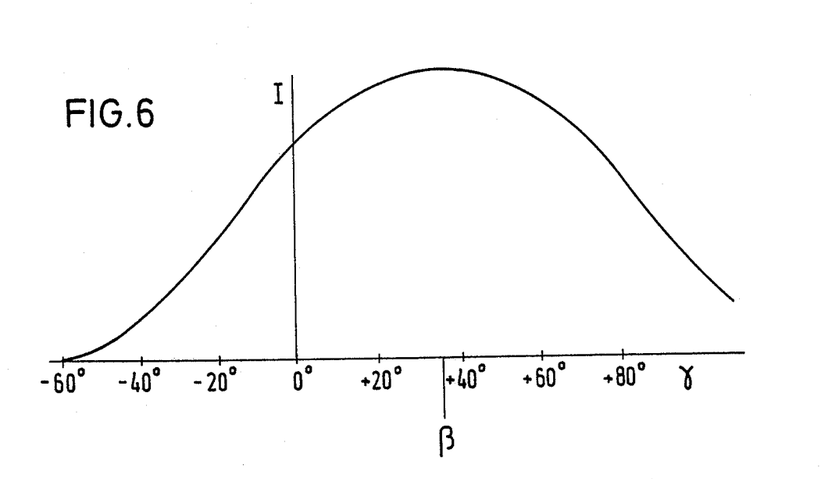
FIG. 6 shows the frequency distribution according to FIG. 4 in an embodiment having focusing points arranged in accordance with FIG. 5.

FIG. 5 shows, in accordance with the illustration of FIG. 2, the case in which the focusing points F1 and F2 are axially offset mutually. The connecting line of the centers of the focusing points F1 and F2 forms angle with the axial normal plane. By changing angle $\gamma$ so that the focusing point F1 remains stationary while focusing point F2 is shifted in paraxial direction to the optical axis, the resultant course of integral I (proportional to the measuring rate) subject to angle $\gamma$ is shown in FIG. 6. It is obvious that I assumes the maximum value if $\gamma$ is equal to $\beta$, in other words, if the straight line traversing the centers of the focusing points F1 and F2 extends exactly in flow direction. Therefore, by determing the position of the maximum, one may detect the flow angle $\gamma$ relative to the normal line to the optical axis of the system.

The disclosed measuring method relies on the fact that during the shifting of F2, the flow and measuring conditions remains unchanged. If so, the measuring rate need not be calibrated additionally. In case of a change of the foregoing parameters, for instance, of the laser capacity, the maximum of the measuring rate will adjust itself to another value, in the subsequent measuring cycle, but the position of the maximum, or the flow angle $\beta$, remains unchanged. It is unfavorable for the maximum of the curve shown in FIG. 6 to be very flat thus allowing only an inexact determination of the position F2, it would be necessary to take a new series of measurements requiring a lot of time, indeed.

Figure 7A:
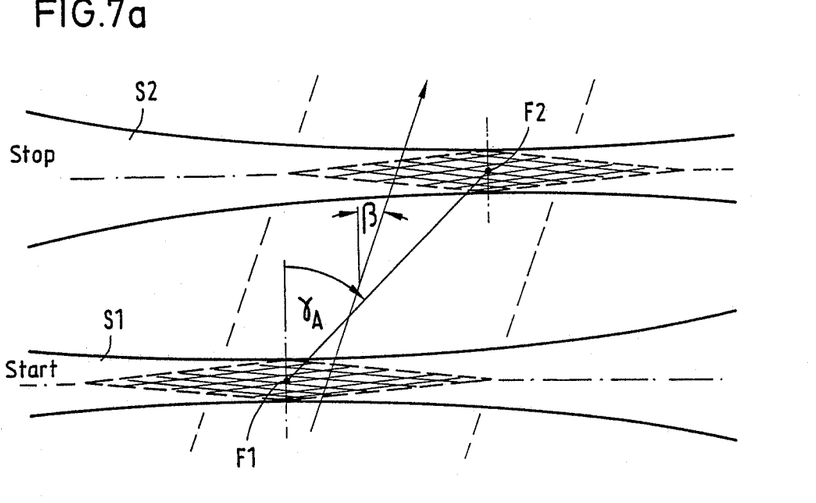
FIG. 7 is a view of two systems A and B of focusing points being mutually offset differently.
Figure 7B:
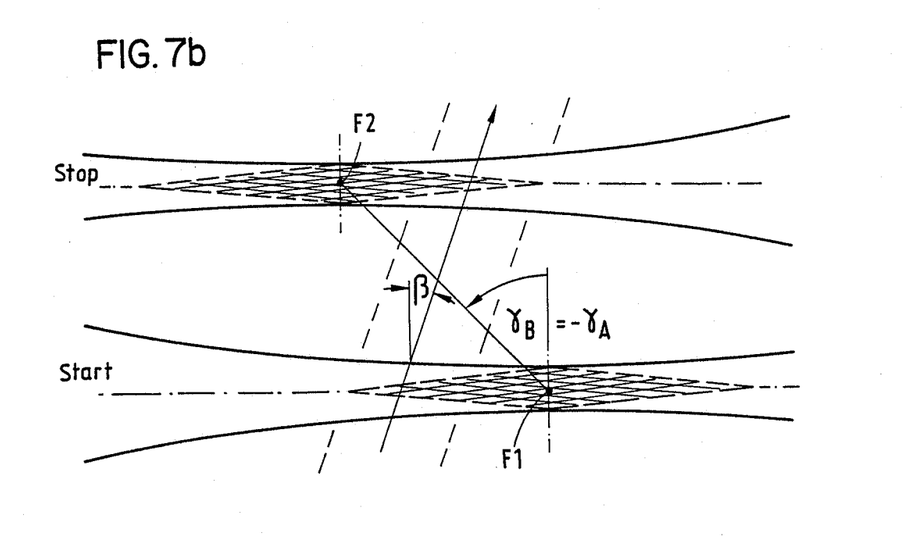

The basic principles of the process of the invention will be now explained with reference to FIG. 7. In system A, shown in FIG. 7a, the center of the focusing point F2 is displaced by angle $\gamma_A = 45°$ with respect to the center of focusing point F1. In the system illustrated in FIG. 7b, on the other hand, focusing point F2 is displaced relative to F1 by the angle $\gamma_B = -45°$ In system A, with flow vectors of $\beta = +45°$, the rate of signals is higher, while, in case of flow angles of $\beta = g -45°$, the measuring rate falls back to zero. The same is applicable, vice versa, to system B. FIG. 7 also shows that a particle traversing focusing point F1 is detected by a photodetector which generates a start signal, while a stop signal is produced with the traversal of focusing point F2.

Figure 8:
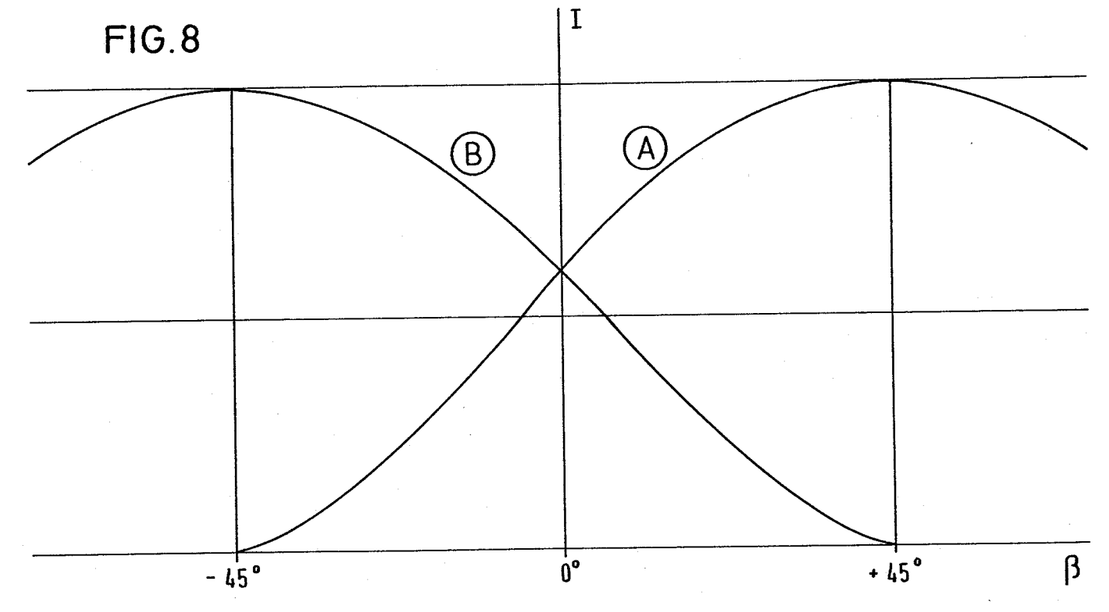
FIG. 8 shows the integral values of the frequency distributions (measuring rates) in the two systems of FIG. 7, with respect to angle $\beta$.

FIG. 8 shows integral I (or the measuring rate) above angle $\gamma$ for both of the systems A and B according to FIG. 7. In case of flow angle $\beta = 0°$, both systems have a measuring rate of about 60% of the maximum measuring rate. It is evident that, in case of flow angles within the range of $-30° < \beta < +30°$, both system systems display a nearly linear characteristic and a high sensitivity. If one measures with both systems at the same place of measurement, it is possible to determine the flow angle $\beta$ from the difference of the measuring rates of systems A and B.

Figure 9:
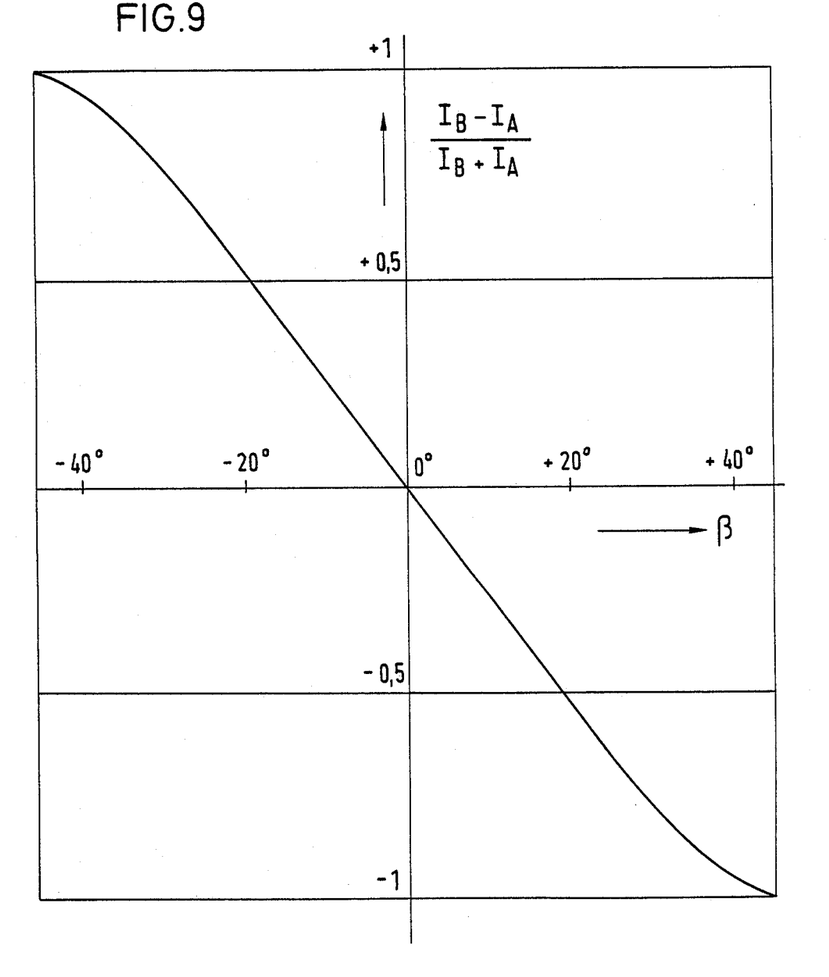
FIG. 9 is a graph of the standardized difference of the measuring rates with respect to the flow angle $\beta$ to clearly show the linearity between said difference and angle $\beta$.

FIG. 9 shows the difference $(I_B - I_A)$ standardized to $(I_A + I_B)$ in the form of the expression $(I_B - I_A) / (I_B + I_A)$. It is obvious that the results thereof is a good linearity of the curve. Thus, by simple means, the flow angle $\beta$ may be determined from the difference $(I_B - I_A)$.

The relation shown in FIG. 9 still only depends substantially upon the axial displacement of the focusing points which may be characterized by the angles $\gamma_A$ and $\gamma_B$ (in the instant example, $\gamma_A = +45°$ and $\gamma_B = -45°$), and upon the axial extension L of the focusing points. The curve may be determined by experimental gauging. The axial displacement of the focusing points may be simply obtained by employing a lens which is not completely corrected chromatically thus entailing different focusing lengths for different light colors.

FIG. 10 shows a device by which the two measurements A and B may be performed successively.

According to FIG. 10, there is provided a tubular elongated optical head OK into which extends a light guide cable LI. Light guide cable LI is of the polarizationmaintaining type whose uncoupling unit $LI_O$ is arranged along the optical axis OA. The polychromatic light beam divergently emerging from the uncoupling unit $LI_O$ is parallelized by lens L1 to be supplied along the optical axis to the focusing means FV which, in successive order in the beam path, comprises a dispersion prism DP and a focusing les LS1. Behind the latter, radiation emerges from the optical head OK to be focused in the measuring volume MV.

Radiation which is reflected by particles in the measuring volume MV is parallel-directed by lens LS1. By the dispersion prism, said parallel radiation is guided in counter direction to the forward radiation and supplied to the collecting lens LS2 which focuses said radiation to the coupling unit $LII_I$ of a light guide LII.

Along the optical axis OA, the collecting lens LS2 comprises a central aperture which is traversed by the beam emerging from the coupling unit $LI_O$. Due to the dispersion prism DP, colors contained in the incident light beam are separated spatially to be focused in the measuring volume MV at focusing points corresponding to different angles of deviation and, hence, being mutually offset transversely to the optical axis OA. In the instant case, the green light component is focused at point F1, while the blue light component is focused at point F2. The other light components focused between points F1 and F2 may be disregarded in the instant process.

Figure 10A:
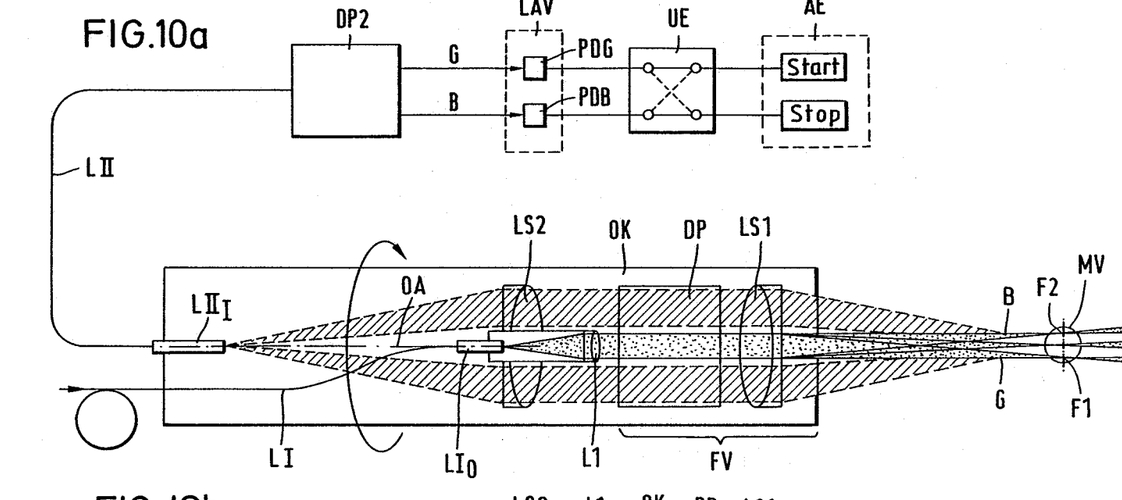
FIG. 10 is a plan view and a side view of one embodiment of the measuring means.
Figure 10B:
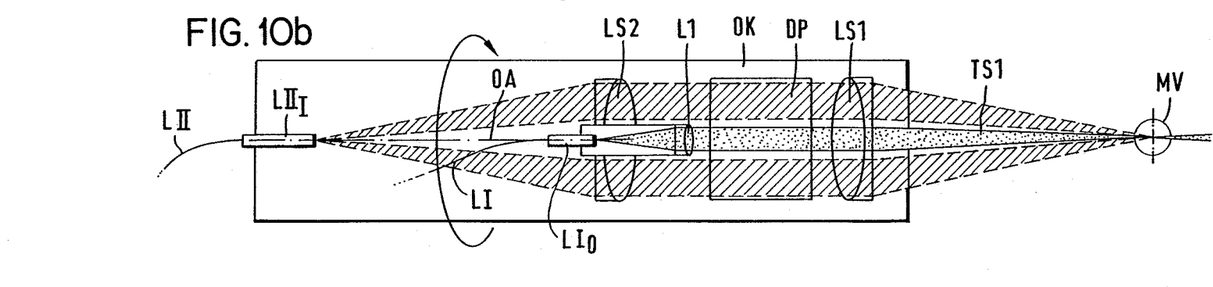

FIG. 10a shows plan view of the apparatus, while FIG. 10b illustrates a side view thereof. It is evidence therefrom that in the measuring volume MV, the focusing points situated in a plane including the optical axis OA are mutually offset laterally in said plane.

Figure 11A:
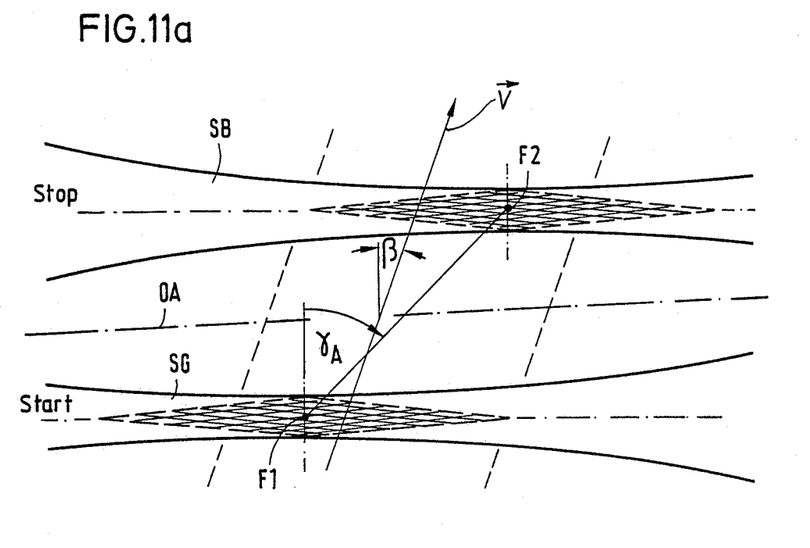
FIG. 11 shows the different locations of the focusing points in a device according to FIG. 10, if the focusing means is rotated about 180°, to pass over from measuring system A to measuring system B.
Figure 11B:
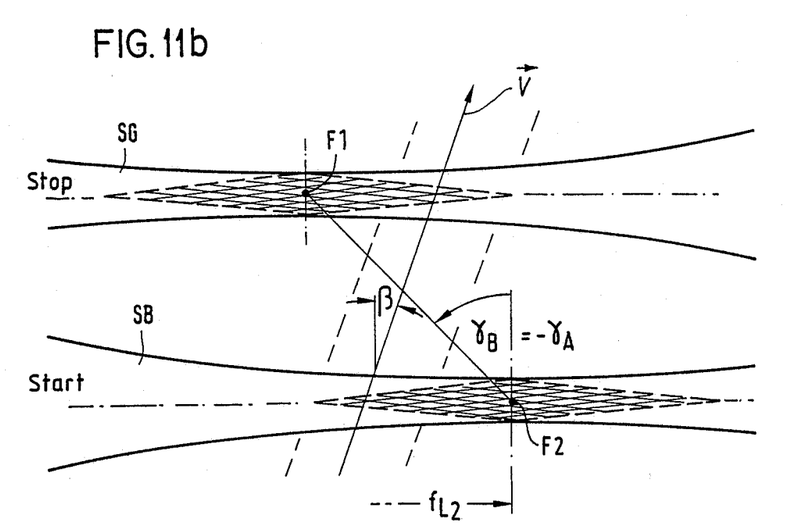

As obvious from FIG. 11, due to the chromatic properties of lens LS1, the centers of the focusing points F1 and F2 are also mutually offset in direction of the optical axis OA. Due to the chromatic properties of lens LS1, in other words, the individual light colors are focused with different focusing lengths. The straight line passing through the centers of the focusing points F1 and F2 extends at an angle $\gamma_A$ relative to the normal plane of the optical axis OA in system A of FIG. 11. The flow angle to the normal plane being designated with $\beta$.

By turning the optical head OK about the optical axis OA, the radiation plane in which extend the axes of beams SB and SG is so rotated that the flow vector $\vec{v}$ is positioned in said plane.

With the measurement A in FIG. 11, a relatively high measuring rate is obtained because angle $\gamma_A$, characterizing the axial beam displacement, is approximately equal to flow angle $\beta$ formed by the flow vector and the axial normal plane. In case of measurement A, the particles, as they pass the focusing point F1 of the green beams SG, produce start pulses, while stop pulses are produced by them as they pass the focusing point F2 of the blue beam SB.

Subsequent to measurement A, there is performed measurement B for which, as compared to measurement A, the optical head OK is turned by 180° about optical axis OA. Now, with respect to the flow direction, the blue beam SB is in front of the green beam SG the particles passing through the focusing point F2 produce start pulses while stop pulses are produced in passing the focusing point F1 of the green beam. For measurement B, angle $\gamma_B$, formed by the straight line extending through the centers of forcusing points F1 and F2 with the axial normal plane, is equal to angle $-\gamma_A$. The resultant measuring rate is rather low because of the considerable angle difference $\beta - \gamma_B$ existing in this case.

From the difference of the measuring rates in measurements A and B, there is obtained flow angle $\beta$ with the known gauging curve according to FIG. 9.

In case of the measuring system of FIG. 10 in which the beam going to measuring volume MV is guided centrally along the optical axis OA through the optical head OK, the returning light reflected by particles in the measuring volume MV is parallel-directed by lens LS1 and the various color components are united again in the dispersion prism DP. The returning light beam is fed into light guide LII by collecting lens LS2, said light guide extending outside the optical head to another dispersion prism DP2 in which the green beam SG and the blue beam SB are mutually separated spatially and supplied to the light receiving means LAV which contains a photodetector PDG for green light and a photodetector PDB for blue light. Via a selector unit UE, the electric signals of both photodetectors are supplied to the evaluation unit AE which contains a start signal generator and a stop signal generator. For measurement A, the selector unit UE establishes connections as shown in solid lines in Fig. 10, whereby the output of photodetector PDG, produces start signal, while the output of photodetector PDB, produces stop signals. On the other hand, in case of measurement B, the selector unit UE establishes the dashed line connections, whereby photodetectors PDB produces start signals and photodetector PDG the stop signals.

Due to the disclosed performance, it is possible, by only using a lens LS1 having chromatic properties, that the two dimensional multicolor system becomes a three dimensional system in which one may also determine the component of the flow vector $\vec{v}$ extending in direction of the optical axis OA. Each time, a changeover from measurement A to measurement B is made, by turning the optical head OA about 180°, the selector unit UE is operated simultaneously. The process shown in FIGS. 10 and 11 is somewhat disadvantageous in that both measurements A and B have to be made successively in time thus involving a prolongation of the measuring time by a factor of 2 as compared to the present two dimensional measurements.

Figure 12A:
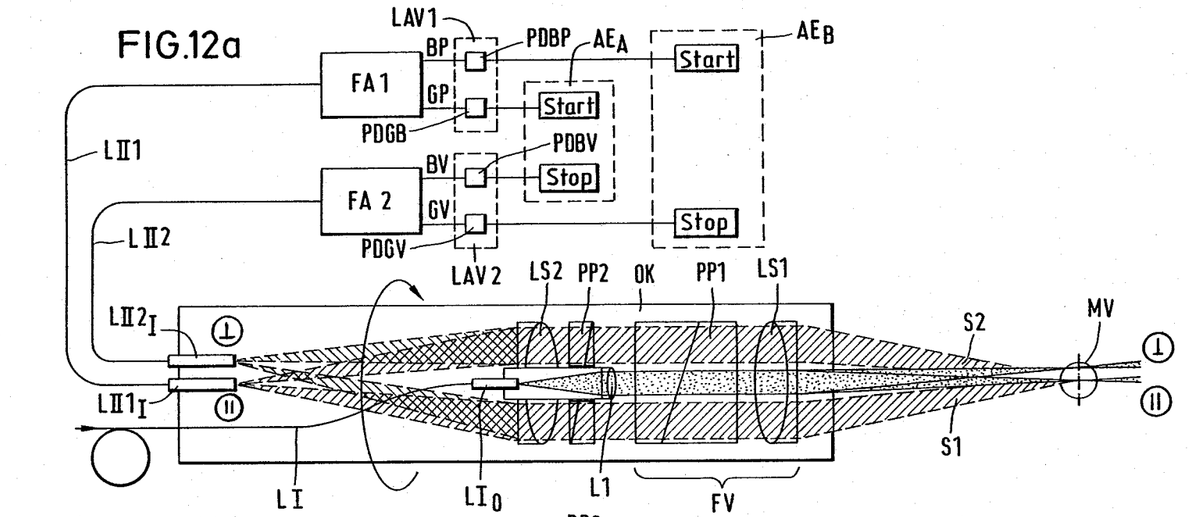
FIG. 12 shows a plan view and a side view of another embodiment of the measuring means.
Figure 12B:
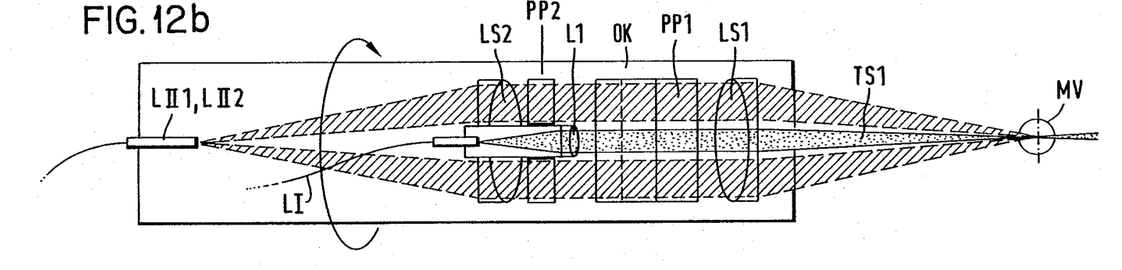
Figure 13:
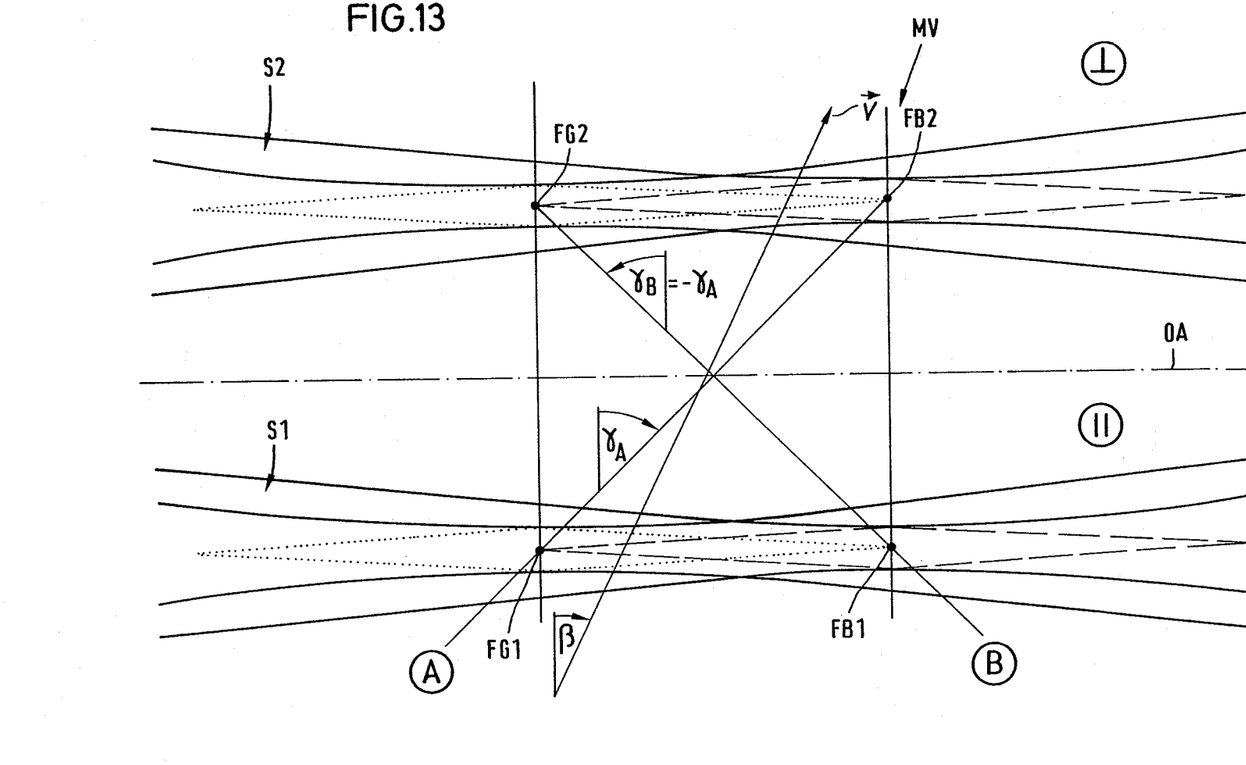
FIG. 13 shows the four focusing points resulting from the device of FIG. 12

FIGS. 12 and 13 show an embodiment in which measurements A and B may be carried out simultaneously. The basic design of optical head OK is the same as that of FIG. 10, however, a polarization prism PP1 is provided instead of the dispersion prism. Further, between lens LS2 and polarization prism PP1, another polarization prism PP2 contains a central opening for the passage of the forward beam.

The light guide LI of FIG. 12 is of the monomode type having polarization-maintaining properties, the heterochromatic 15 light supplied to said light guide being polarized linearly at 45°. In the polarization prism PP1, the light moving forward is split into two beams of the same intensity which are polarized vertically with respect to each other and which, due to their different exit angles are spatially separated from one another. Hence, by lens LS1, one obtains two focused beams S1 and S2 of different polarization directions in the measuring volume MV. Both beams being heterochromatic in case of an appropriate chromatic focal length distribution of lens LS1, the individual colors of both beams are imaged at different axial points in their smallest diameter. This is illustrated in FIG. 13. The green components of both beams S1 and S2 have green focusing points FG1 and FG2 positioned at the same axial distance from the focusing means FV, while the blue focusing points FB1 and FB2 also being spaced mutually at equal distance from the focusing means, are farther away from the focusing means than the green focusing points. Beam S1 is parallel-polarized, while beam S2 is vertically polarized.

For measurement A, the focusing point FG1 is used to generated start pulses, while focusing point FB2 serves for the production of stop pulses. The straight line traversing the centers of said focusing points forms angle $\gamma_A$ with the normal plane to the optical axis OA. For measurement B, the focusing point FB1 is used for generating start pulses, while focusing point FG2 is used for generating stop pulses. The straight line traversing both said focusing points forms the angle $\gamma_B = -\gamma_A$ with the normal plane to the optical axis OA.

The scattered light from the measuring volume MV is collected by the outer region of lens LS1 to be conducted through the polarization beam divider PP1 thus reversing again the color displacement and the splitting into the two directions of polarization. The further polarization beam divider PP2 provided with a central aperture is used to image by means of lens LS2 the differently scattered light from the focusing points on two coupling units LII1$_I$ and LII2$_I$ spaced sufficienty from each other. Light guides LII$_1$ and LII$_2$ connected to the coupling units extend to a corresponding color splitting unit FA1 and FA2 respectively which spatially separates from the heterochromatic light, the components of interest, blue and green. Color splitting unit FA1 receives the parallel-polarized light portion, whereas color splitting unit FA2 receives the vertically polarized light portion, color splitting unit FA1 generating a parallel-polarized blue beam BP and a parallel-polarized green beam GP, which, by photodetectors PDBP and PDGB are converted into electric signals. From the vertically polarized beam, color splitting unit FA2 produces a blue beam BV and a green beam GV which are spatially separated and guided to the respective photodetectors PDBV and PDGV which are responsive to the intensities of said light beams to produce electric pulses.

In response to the output of photodetector PDGB, being supplied for measurement A to the evaluating unit AE$_A$, a start pulse is generated while the output signal of photodetectors PDBV produces a stop pulse in said evaluating unit AE$_A$. For the second measurement B, the output signal of photodetector PDBP is supplied to the evaluating unit AE$_B$ to produce thereat a start pulse while the output signal of photodetector PDBV is also supplied to the evaluating unit AE$_B$ to produce thereat a stop pulse.

Both measuring systems A and B are recording the same speed rate of vector $\vec{V}$. Therefore, only one system is required for the evaluating electronics. It is only necessary to determine simultaneously and independently the measuring rate for both systems A and B. A relatively insignificant additional electronic expenditure is necessary to this effect.

If the distance between beams S1 and S2 is to be changed, one only need to interchange the polarization beam divider PP1, while no readjustment of the system is involved therewith.

Figure 14A:
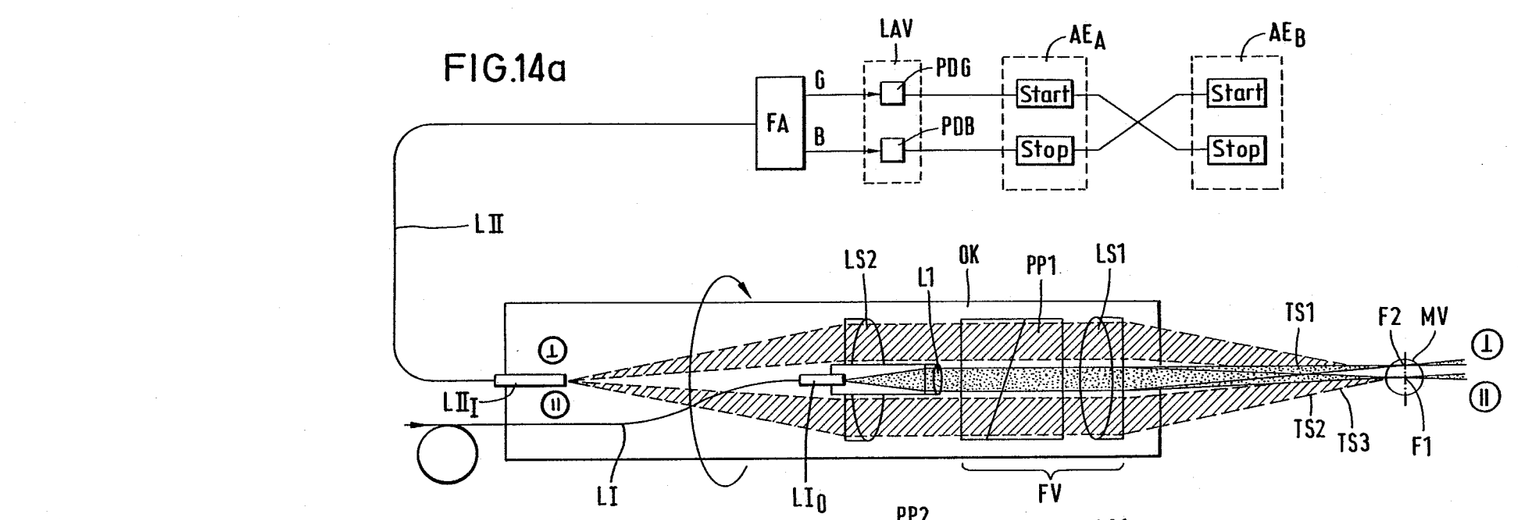
FIG. 14 is another embodiment of the device of a design which is simplified over that of FIG. 12.
Figure 14B:
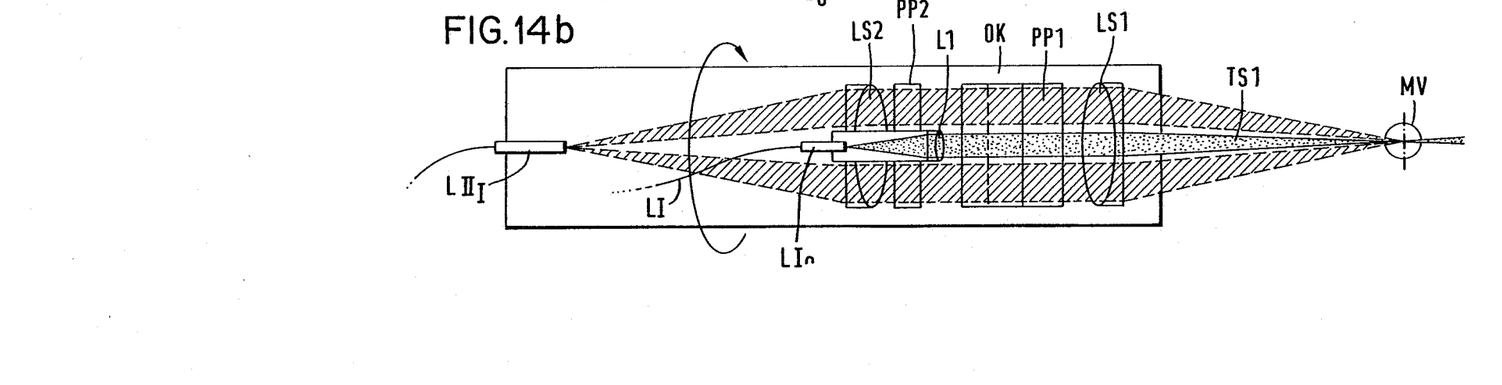

Another still simpler variant of the process is shown in FIG. 14. In this system, the course of radiation shown in FIG. 13 is also produced in the measuring volume MV. The optical head OK of the apparatus of FIG. 14 is distinctive from that of FIG. 12 only by the absence of polarization beam divider PP2.

Furthermore, lens LS2 is focusing the returning beams to one sole coupling element LII$_I$ to which light guide LII extending to the sole color splitting unit FA is joined. From the returning light beam, the color splitting unit FA selects the green component G and the blue component B which are guided individually to the light receiving means LAV containing a photodetector PDG for the green light beam and a photodetector PDB for the blue light beam. The output signal of the photodetector PDG is supplied as start signal of the evaluating means AE$_A$ for measurement A, while the output signal of photodetector PDB for the blue light is supplied as stop signal to the evaluating means AE$_A$.

The evaluating means AE$_B$ for the second measurement B receives as start signal the output signal of photodetector PDB and as stop signal the output signal of photodetector PDG.

In the embodiment of FIG. 14, the different polarization of both beams S1 and S2 is only used to spatially separate said beams from each other. Evaluation of the different light components exclusively relies on the color components, regardless of the direction of polarization. Both photodetectors PDG and PDB are recording the total scattered light from the measuring volume. In spite of the different polarization of the scattered light produced by beams S1 and S2, a separation into two mutually vertically polarized scattered light portions may not be realized any more upon the transmission of the scattered light through light guide LII. By said collection of the scattered light of both beams, it is possible to measure the speed with the use of one sole photodetector; e.g., by PDG. However, the sense of direction of the speed (from beam S1 to beam S2 or vice versa) cannot be detected. In many applicabilities, this is not at all favorable, because the approximate flow direction is frequently known before. By means of photodetector PDB, the same speed would be measured as with photodetector PDG, with the provision that the speed in the measuring volume does not change over the length of the axial measuring point displacement of both colors which, typically, is about 0.2 mm.

The data of both evaluating units are forwarded to a multichannel analyzer which displays as a frequency distribution the time measurements between start pulses and stop pulses. Integral I, or the area beneath the frequency curve, is a unit for the measuring rate. The position of the measuring curve reflects the size of the two dimensional speed vector $\vec{V}$ in the normal plane with respect to the optical axis OA. The direction of vector $\vec{V}$ in the normal plane is always determined previously in that the optical head OK is turned about the optical axis OA until the frequency distribution shows a maximum. In said angular position of the optical head, the vector component extending in direction of the optical axis is measured.

What is claimed is:

1. A process for measuring the flow vectors in gas currents containing optically detectable particles, comprising the steps of:
    focusing, with a focusing means, two spacially separated light beams onto two focusing points located at mutually different distances from the focusing means;
    measuring, with a measuring means, the frequencies at which particles successively traverse said focusing points during a first measurement with the distance of the focusing point of one beam from the focusing means being smaller, and during a second measurement being larger than the distance of the other focusing point from the focusing means;
    determining the difference between the measuring results of said first and second measurements; and
    determining the direction of the flow vector with respect to the plane normal to the optical axis of the focusing means using said difference.

2. A process as defined in claim 1, characterized in that various focusing points are produced by heterochromatic light whose colors are focused with different focal distances by the focusing means.

3. A process as defined in claim 1, characterized in that the two measurements are performed successively, the focusing means being turned by 180° about its optical axis between two measurements.

4. A process as defined in claim 2, characterized in that from each beam there are generated at least two focusing points of different colors and that, for both measurements, respective combinations of different color sequences are used.

5. A process as defined in claim 1, characterized in that the two beams are polarized vertically with respect to each other.

6. A process as defined in claim 5, characterized in that the scattered light generated at the particles by the differently polarized beams is spatially selected by a polarization beam divider.

7. Apparatus for measuring flow vectors in gas currents containing optically detectable particles, comprising:
    focusing means for focusing in a measuring volume two spatially separated beams at spacially separated focusing points located at different distances from said focusing means, and
    a light receiving means for receiving the scattered light reflected by the particles at the focusing points and for producing start pulses and stop pulses;
    measuring means for performing two measurements, in which the angle of a straight line traversing the focusing points has different signs with respect to the normal plane relative to the optical axis of the focusing means,
    evaluating means for receiving said pulses and for calculating the difference between said two measurements and the direction of the flow vector with respect to the normal plane dependent on said difference.

8. Apparatus as defined in claim 7, characterized in that the focusing means contains a dispersion prism for the spatial separation of the polychromatic beams.

9. Apparatus as defined in claim 7, characterized in that the focusing means contains a polarization beam divider for the spatial separation of beams.

10. Apparatus as defined in claim 9, characterized in that in the beam path of the light reflected by the particles, there is provided a second polarization divider for the spatial separation of the differently polarized light fractions, and that both light fractions are supplied to separate light receiving means which produce separate start pulses and stop pulses to separate evaluating means.

11. Apparatus as defined in claim 9, characterized in that the light reflected by the particles is supplied to one sole light receiving means which supplies pulses generated by the light of the one color, as start pulses to a first evaluating means and as stop pulses to a second evaluating means, while pulses generated from the light of the second color is supplied as stop pulses to the first evaluating means and as start pulses to the second evaluating means.

12. Apparatus as defined in claim 1, characterized in that an evaluating means forms the difference between the measuring results of the two measurements.

13. A system for measuring the flow vectors of optically detectible particles contained in gas currents flowing through first and second specially separated light beams, comprising:
    focusing means for focusing, in a first focal arrangement, said first and second beams at first and second focusing points, respectively, with said first focusing point positioned farther from said focusing means than said second focusing point, and for focusing, in a second focal arrangement, said first and second beams at fist and second focusing points, respectively, with said second focusing point positioned farther from said focusing means than said first focusing point;
    measuring means for performing a first measurement, measuring the frequencies at which particles successively traverse said focusing points with said focusing means focusing in said first focal arrangement, and for performing a second measurement, measuring the frequencies at which particles successively traverse said focusing points, with said focusing means focusing in said second focal arrangement;
    first determining means for determining the difference between the first and second measurements;
    second determining means for determining the flow vectors of said particles dependent on said difference determined by said first determining means.

14. A system for measuring the flow vectors of optically detectible particles contained in gas currents flowing through first and second spacially separated light beams, comrising:

focusing means for focusing said first and second light beams onto first and second focusing points, respectively, said first and second focusing points being located at first and second distances, respectively, from said focusing means;

interchange means operable for interchanging the respective distances of said first and second focusing points from said focusing means, whereby said first and second focusing points are located at said second and first distances, respectively, from said focusing means;

measuring means for performing a first measurement, measuring the frequencies at which particles successively traverse said focusing points before said interchange means operates on said focusing points, and for performing a second measurement, measuring the frequencies at which particles successively traverse said focusing points after said interchange means has operated on said focusing points;

first determining means for determining the difference between the results of said first and second measurement second determining means for determining the flow vectors of said particles dependent on said difference determined by said first determining means.

15. A system for measuring the flow vectors of particles contained in gas currents flowing through a plurality of spacially-separated light beams in a measuring volume, comprising:

focusing means for focusing one of said light beams onto a first focusing point located in said measuring volume at a first distance from said focusing means and another of said light beams onto a second focusing point located in said measuring volume at a second distance from said focusing means, wherein particles flowing through said measuring volume cross said first focusing point and subsequently cross said second focusing point;

altering means for altering the position of said first and second focusing points with respect to said measuring volume such that said particles flowing through said measuring volume cross said second focusing point and subsequently cross said first focusing point;

measuring means for measuring the flight times required by said particles to travel from said first focusing point to said second focusing point and to perform a first measurement of the integral value of the frequency distribution of said measured flight times before said altering means alters the position of said focusing points, and for measuring the flight times required by said particles to travel from said second focusing point to said first focusing point and to perform a second measurement of the integral value of the frequency distribution of said measured flight times after said altering means alters the position of said focusing points;

first determination means for determining the difference between said first and second measurements;

second determination means for determining the three-dimensional flow vector of said gas current dependent on said difference determined by said first determining means.

16. A system for measuring the flow vectors of particles contained in gas currents flowing through a plurality of spacially-separated light beams in a measuring volume, comprising:

focusing means for focusing one of said light beams onto a first focusing point located in said measuring volume and another of said light beams at a second focusing point located in said measuring volume, said first and second focusing points being positioned so that a line connecting said first and second focusing points forms a first angle with the plane normal to the optical axis of said focusing means;

altering means for altering the position of said first and second focusing points with respect to the measuring volume, the altered positions of said first and second focusing points being arranged so that a line connecting said first and second focusing points forms a second angle with the plane normal to the optical axis of said focusing means, said second angle being equal to and extending in the negative direction of said first angle;

measuring means for measuring the flight times required by said particles to travel from one of said focusing points to the other of said focusing points, for performing a first measurement of the integral value of the frequency distribution of said measured flight times before said altering means alters the position of said focusing points, and for performing a second measurement of the integral value of the frequency distribution of said measured flight times after said altering means alters the position of said focusing points;

first determination means for determining the difference between said first and second measurements;

second determination means for determining the threedimensional flow vector of said gas current dependent on said difference between said first and second measurements.

17. A method for measuring the flow direction of optically detectible particles contained in gas currents flowing through the focusing points of a plurality of light beams, comprising the steps of:

focusing two of said plurality of beams at first and second focusing points, respectively, by a focusing means, said first and second focusing points being spacially separated in the plane normal to the optical axis of said focusing means and also spacially separated along the optical axis such that said first focusing point is positioned at a first distance from said focusing means and said second focusing point is positioned at a second distance from said focusing means, whereby the line connecting the centers of said first and second focusing points extends at a first angle with respect to the plane normal to the optical axis;

detecting, during a first measuring period, the flight times required by said particles passing through said second focusing point to subsequently pass through said first focusing point;

determining a first measuring rate by taking the integral value of the frequency distribution of detected flight times based on said first measuring period;

focusing said two beams at third and fourth focusing points, respectively, said third and fourth focusing points being spacially separated in the plane normal to the optical axis and also spacially separated along the optical axis such that the line connecting the centers of said third and fourth focusing points extends at an angle, equal to the negative value of said first angle, with respect to the plane normal to the optical axis;

detecting, during a second measuring period, the flight times required by said particles passing through one of said focusing points to subsequently pass through the other of said focusing points;

determining a second measuring rate by taking the integral value of the frequency distribution of detected flight times based on said second measuring period;

determining the difference between said first and second measuring rates;

determining said flow direction dependent on said difference between said first and second measuring rates.

18. A method as in claim 17 wherein said first, second, third and fourth focusing points are produced simultaneously from said two beams and wherein said first and second measuring periods occur simultaneously.

19. An optical apparatus operable on first and second light beams for determining the flow vector angle, with respect to the optical axis of the apparatus, of optically detectible particles contained in gas currents flowing through the focusing points of said light beams, comprising:

focusing means for focusing said first and second light beams onto first and second focusing points, respectively, located at first and second distances, respectively, from said focusing means, and spacially separated from each other in the plane normal to said optical axis;

positioning means, operable to perform a first positioning operation for positioning the axis of said first and second light beams in the same plane as said flow vector, with said first beam in front of said second beam, with respect to said flow vector, whereby said particles traverse the focusing point of said first beam and subsequently traverse the focusing point of said second beam, said positioning means being operable to perform a second positioning operation for positioning the axis of said first and second light beams in the same plane as said flow vector, with said second beam in front of said first beam, with respect to said flow vector, whereby said particles traverse the focusing point of said second beam and subsequently traverse the focusing point of said first beam;

detecting means for detecting particles traversing said first and second focusing points;

measuring means for measuring, during a first time period, the flow times of said particles occurring between the traversing of said first focusing point to the traversing of said second focusing point following a first positioning operation by said positioning means, and for measuring, during a second measuring period, the flow times of said particles occurring between the traversing of said second focusing point to the traversing of said first focusing point following a second positioning operation by said positioning means;

first determination means for determining the first frequency distribution of said measured flight times measured during said first measuring period and for determining a second frequency distribution of said measured flight times measured during said second measuring period;

second determination means for determining the integral value of said first frequency distribution based on said first time period, and said second frequency distribution based on said second time period;

third determination means for determining the difference between the integral values of said first and second frequency distributions;

fourth determination means for determining said flow vector dependent on said difference between the integral values of said first and second frequency distribution.

20. An optical apparatus operable on first and second light beams for determining the flow vector angle, with respect to the optical axis of the apparatus, of optically detectible particles contained in gas currents flowing through the focusing points of said light beams, comprising:

focusing means for focusing said first light beam onto first and second focusing points and for focusing said second light beam onto third and fourth focusing points, said first and third focusing points being located at a first distance from said focusing means and said second and fourth focusing points being located at a second distance from said focusing means, said first and second focusing points being spacially separated from said third and fourth focusing points in the plane normal to the optical axis;

detecting means for detecting particles traversing said third focusing point and subsequently traversing said second focusing point and for detecting particles traversing said fourth focusing point and subsequently traversing said first focusing point;

measuring means for measuring, during a first time period, the flow times of said particles occurring between the traversing of said third focusing point to the traversing of said second focusing point and for measuring, during a second time period, the flow times of said particles occurring between the traversing of said fourth focusing point to the traversing of said first focusing point;

first determination means for determining the first frequency distribution of said measured flight times measured during said first time period and for determining the second frequency distribution of said measured flight times measured during said second time period;

second determination means for determining the integral value of said first frequency distribution based on said first time period and said second frequency distribution based on said second time period;

third determination means for determining the difference between the integral values of said first and second frequency distribution;

fourth determination means for determining said flow vector dependent on said difference between the integral values of said first and second frequency distribution.

21. A system for determining the direction of flow vectors of particles contained in gas currents flowing through at least a first and a second light beam focused, by focusing means, in a measuring volume, comprising the steps of:

focusing said first beam onto at least a first focusing point located in said measuring volume at a first distance from said focusing means, and said second beam onto at least a second focusing point located in said measuring volume at a second distance from said focusing means;

positioning said first and second focusing points in the plane of said flow vectors with said first focusing point in front of said second focusing point with respect to the direction of said flow vectors;
detecting particles flowing through said first and second focusing points;
measuring, during a first time period, the flight times of particles flowing from said first focusing point to said second focusing point;
determining a first determination of the integral value, vased on said first time period, of the frequency distribution of said measured flight times;
positioning said first and second focusing points in the plane of said flow vectors with said second focusing point in front of said first focusing point with respect to the direction of said flow vectors;
detecting particles flowing through said first and second focusing points;
measuring, during a second time period, the flight times of particles flowing from said second focusing point to said first focusing point;
determining a second determination of the integral value, based on said second time period, of the frequency distribution of said measured flight times;
determining the difference between said first and second determinations;
determining the direction of said flow vectors dependent on said difference between said first and second determinations.

22. A system for determining the flow vectors of particles contained in gas currents flowing through at least a first and a second light beam in a measuring volume, comprising:
focusing means for focusing said first beam onto at least a first focusing point located in said measuring volume at a first distance from said focusing means, and for focusing said second beam onto at least a second focusing point located in said measuring volume at a second distance from said focusing means;
positioning means operable for positioning said first and second focusing points in the plane of the flow vector and in a first spacial arrangement with said first focusing point in front of said second focusing point with respect to the direction of said flow vectors, and in a second spacial arrangement with said second focusing point in front of said first focusing point with respect to the direction of the flow of said flow vectors;
detection means for detecting particles flowing through said first and second focusing points;
measuring means for measuring, during a first time period, with said focusing points arranged in said first arrangement, the flight times of particles flowing from said first focusing point to said second focusing point, and for measuring, during a second time period, with said focusing points arranged in said second arrangement, the flight times of particles flowing from said second focusing point to said first focusing point;
first determining means for performing a first determination, determining the integral value, based on said first time period, of the frequency distribution of flight times measured during said first time period, and for performing a second determination, determining the integral value, based on said second time period, of the frequency distribution of flight times measured during said second time period;
second determining means for determining the different between said first and second determinations; and
third determining means for determining the direction of said flow vectors dependent on said difference.

* * * * *